(12) United States Patent
Hagen et al.

(10) Patent No.: US 6,491,315 B2
(45) Date of Patent: Dec. 10, 2002

(54) BRAKE WARNING AND STEP FOR BUMPER

(76) Inventors: James A. Hagen, 5711 100th St. NE., #95, Marysville, WA (US) 98270; Jerry Wentz, P.O. Box 3034, Minot, ND (US) 58102

( * ) Notice: Subject to any disclaimer, the term of this patent is extended or adjusted under 35 U.S.C. 154(b) by 0 days.

(21) Appl. No.: 09/742,352

(22) Filed: Dec. 22, 2000

(65) Prior Publication Data

US 2002/0079669 A1 Jun. 27, 2002

(51) Int. Cl.⁷ ............... B60R 3/00; B60R 11/00; B60R 9/00
(52) U.S. Cl. ............... 280/164.1; 280/169; 280/163; 224/527
(58) Field of Search ............... 280/763.1, 163, 280/164.1, 169, 491.5; 362/499, 541; 224/527, 404

(56) References Cited

U.S. PATENT DOCUMENTS

| | | | | |
|---|---|---|---|---|
| 2,492,914 A | * | 12/1949 | Barden | 280/163 |
| 2,649,308 A | * | 8/1953 | Bice, Jr. | 280/164.1 |
| 4,266,817 A | * | 5/1981 | Mason et al. | 280/164.1 |
| 4,774,590 A | * | 9/1988 | Chesney | 358/401 |
| 4,800,471 A | * | 1/1989 | Lippert | 340/479 |
| 4,809,891 A | * | 3/1989 | Partin | 224/413 |
| 4,906,015 A | * | 3/1990 | LaCroix et al. | 224/519 |
| D338,861 S | | 8/1993 | Lataster | |
| 5,340,177 A | * | 8/1994 | Maxam | 280/164.1 |
| 5,421,612 A | * | 6/1995 | Floe | 280/491.5 |
| 5,713,589 A | * | 2/1998 | Delgado et al. | 280/163 |
| 5,829,774 A | | 11/1998 | Klemp | |
| 5,868,412 A | * | 2/1999 | Hinkle | 280/163 |
| 5,979,094 A | | 11/1999 | Brafford, Jr. | |
| 5,996,869 A | * | 12/1999 | Belinky et al. | 116/28 R |
| 6,007,033 A | | 12/1999 | Casson et al. | |
| 6,015,223 A | * | 1/2000 | Kidd et al. | 362/503 |
| 6,039,070 A | * | 3/2000 | Zaehe | 137/491 |
| 6,042,175 A | * | 3/2000 | Williams | 296/100.06 |
| 6,053,626 A | * | 4/2000 | Zagrodnik et al. | 362/541 |
| 6,095,387 A | * | 8/2000 | Lipscomb | 224/485 |
| 6,140,919 A | * | 10/2000 | Buchanan | 340/465 |
| 6,145,861 A | * | 11/2000 | Willis | 280/163 |
| 6,173,979 B1 | * | 1/2001 | Bernard | 280/163 |
| 6,202,909 B1 | * | 3/2001 | Belinky et al. | 224/522 |
| 6,354,723 B1 | * | 3/2002 | Spence | 280/164.1 |
| 6,357,899 B1 | * | 3/2002 | Craven | 362/499 |

* cited by examiner

*Primary Examiner*—Paul N. Dickson
*Assistant Examiner*—Joselynn Y Sliteris
(74) *Attorney, Agent, or Firm*—Richard C. Litman

(57) ABSTRACT

A brake warning and step for bumper which is a combination brake warning light assembly and step that is inserted into a vehicle's trailer hitch connection. The device comprises a tubular steel housing having a tubular steel hitch insertion member opposite a side with three or four holes having brake lights mounted therein. The lights are connected to the vehicle's wiring harness using a suitable connection and are illuminated when the brakes are applied to give following vehicles additional warning that a stop is being made. Also, the device is strong enough to be used as a step when attached to a sport utility vehicle or truck hitch connection.

5 Claims, 4 Drawing Sheets

BRAKE WARNING AND STEP FOR BUMPER

BACKGROUND OF THE INVENTION

1. Field of the Invention

The present invention relates to vehicle bumpers and, more particularly, to a combination brake warning light and step insertable into a vehicle's trailer hitch connection.

2. Description of the Related Art

A vehicle trailer hitch connection is, generally, a rectangular tubular member attached to the rear portion of a vehicle, and opening away from the rear of the vehicle to receive a rectangular element having a trailer hitch ball neck at its remote end. The trailer hitch connection is unsightly when not in use. It would be desirable to have an insert to cover this open tubular member. It is also recognized that additional brake lights at the rear of a vehicle are generally advantageous from a safety aspect. It would further be a convenience to have a step in the rear of the vehicle to access a truck bed or car trunk more easily.

U.S. Pat. No. 5,979,094, issued May 19, 1998, to Brafford, Jr., describes a protective trailer hitch accessory that includes a lighted sign, auxiliary brake lights, and a protective cover for a trailer hitch. The Brafford, Jr. device is fastened to the trailer hitch connection and electrically wired to the vehicle's brake light brake warning system using a harness. This system is not, however, an integral unit. It requires an intermediate rectangular tubular member, and does not provide any convenient step.

U.S. Pat. No. 6,007,033, issued Dec. 28, 1999, to Casson et al., describes a placard or brake light accessory unit for a vehicle hitch. The device of Casson et al. is installed in and substantially conceals the opening of a hitch socket. The device also includes supports of various shapes and sizes for displaying removable signs or lights.

U.S. Pat. No. 5,829,774, issued Nov. 3, 1998 to Klemp, describes a combination step and bumper assembly that is releasably coupled to the hitch connection at the rear of the vehicle. The assembly conceals the hitch from view and provides a step support.

U.S. Pat. No. Des. 338,861 shows a bumper attachable to a decorative cover for a vehicle trailer hitch attachment tube.

None of the above inventions and patents, taken either singularly or in combination, is seen to describe the instant invention as claimed. Thus a brake warning and step for a bumper solving the aforementioned problems is desired.

SUMMARY OF THE INVENTION

The present invention is a combination brake warning light assembly and step that is inserted into a vehicle's trailer hitch connection. The device comprises a rectilinear, tubular steel housing having a tubular steel hitch insertion member attached to its back wall, and opposite a front wall having three or four holes supporting brake lights mounted therein. The lights are connected to the vehicle's wiring harness using a suitable connection and are illuminated when the brakes are applied to give following vehicles additional warning that a stop is being made. Also, the device is strong enough to be used as a step when attached to a sport utility vehicle or truck hitch connection.

Accordingly, it is a principal object of the invention to provide a decorative cover for a vehicle trailer open hitch attachment tube.

It is another object of the invention to provide a decorative cover for a vehicle trailer hitch attachment tube as above which provides additional brake lights for signaling an impending stop of the vehicle.

It is a further object of the invention to provide a decorative cover for a vehicle trailer hitch attachment tube as above which is adequately sturdy to provide a step for easy access to a truck bed, automobile trunk, etc.

Still another object of the invention is to provide a decorative cover for a vehicle trailer hitch attachment tube as above which has an electrical wiring harness and a plug for plugging in to the vehicle's trailer auxiliary wiring plug.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a combination brake warning light and step assembly that is inserted into a vehicle's trailer hitch. The present assembly comprises a tubular steel housing having a back wall with a tubular steel hitch insertion member attached thereto and a front wall with three or four holes having brake lights mounted therein. The lights are connected to the vehicle's wiring harness using a suitable connection and are illuminated when the brakes are applied to give following vehicles additional warning that a stop is being made. Also, the assembly is strong enough to be used as a step, particularly when attached to a sport utility vehicle or truck hitch connection.

Figure 1:
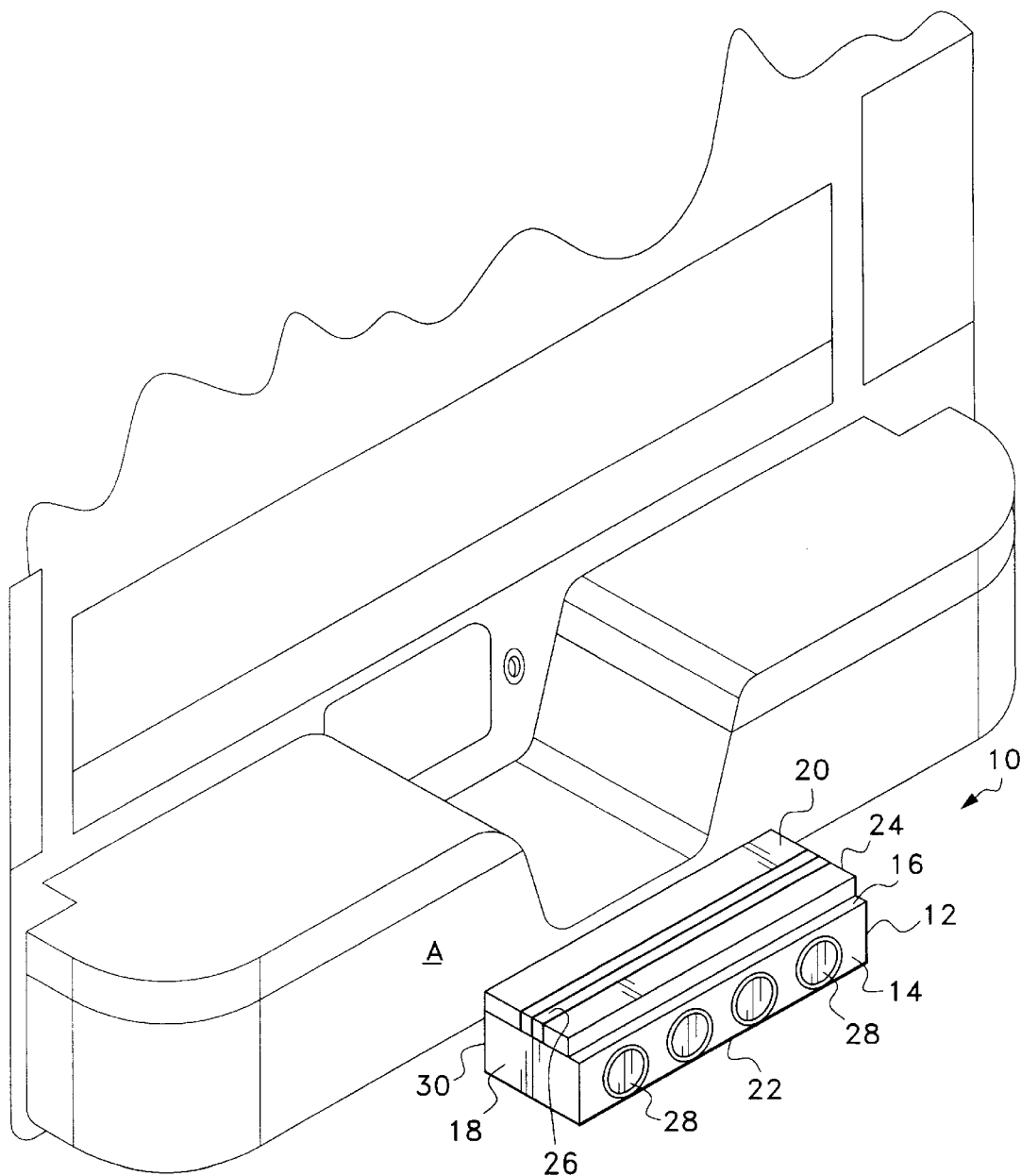
FIG. 1 is an environmental, perspective view of a brake warning light and step for a bumper according to the present invention.

Referring to FIG. 1, there is shown an environmental, perspective view of a brake warning light and step assembly 10 for insertion into a trailer hitch B (see FIG. 3) adjacent a vehicle rear bumper A. The assembly 10 includes a housing unit 12 having a generally rectilinear, tubular structure with a generally rectangular cross section. Housing unit 12 comprises front wall 14, opposite back wall 30, top wall 16, first end wall 18, tread member 20 mounted on top wall 16, bottom wall 22 and second end wall 24. Tread member 20 includes tread ridges 26 to impart antislip characteristics to tread member 20. Housing unit 12 has at least one, and preferably a plurality of brake warning lights 28 mounted along front wall 14.

Figure 2:
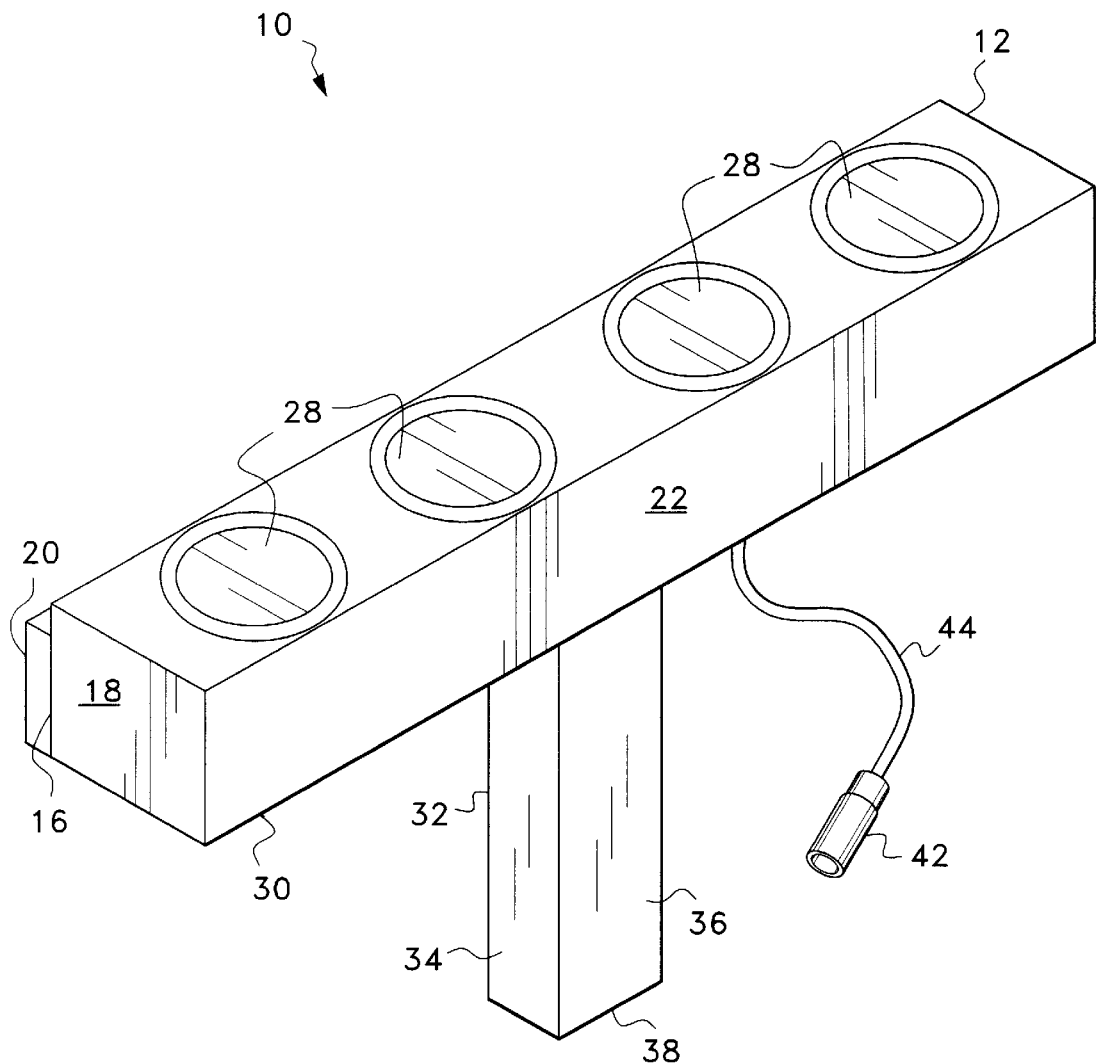
FIG. 2 is a bottom view of the brake warning light and step of FIG. 1.

Referring to FIG. 2, housing unit 12 further includes tongue or post member 32 having a rectilinear, tubular shape with a rectangular cross section. Member 32 is attached centrally and perpendicularly at one end to back wall 30 by welding or other appropriate attachment means. Post member 32 has side walls 34 and top and bottom walls 36 and has an opposite end 38 insertable in trailer hitch B. Extending from housing unit 12 is electrical conductor wire 44 connected at one end to brake warning lights 28. Attached at the opposite end of electrical conductor wire 44 is connector 42 for engagement with a standard vehicle electrical receptacle (not shown), whereby electrical actuation of brake warning lights 28 is accomplished upon operation of the vehicle's brake pedal.

Figure 3:
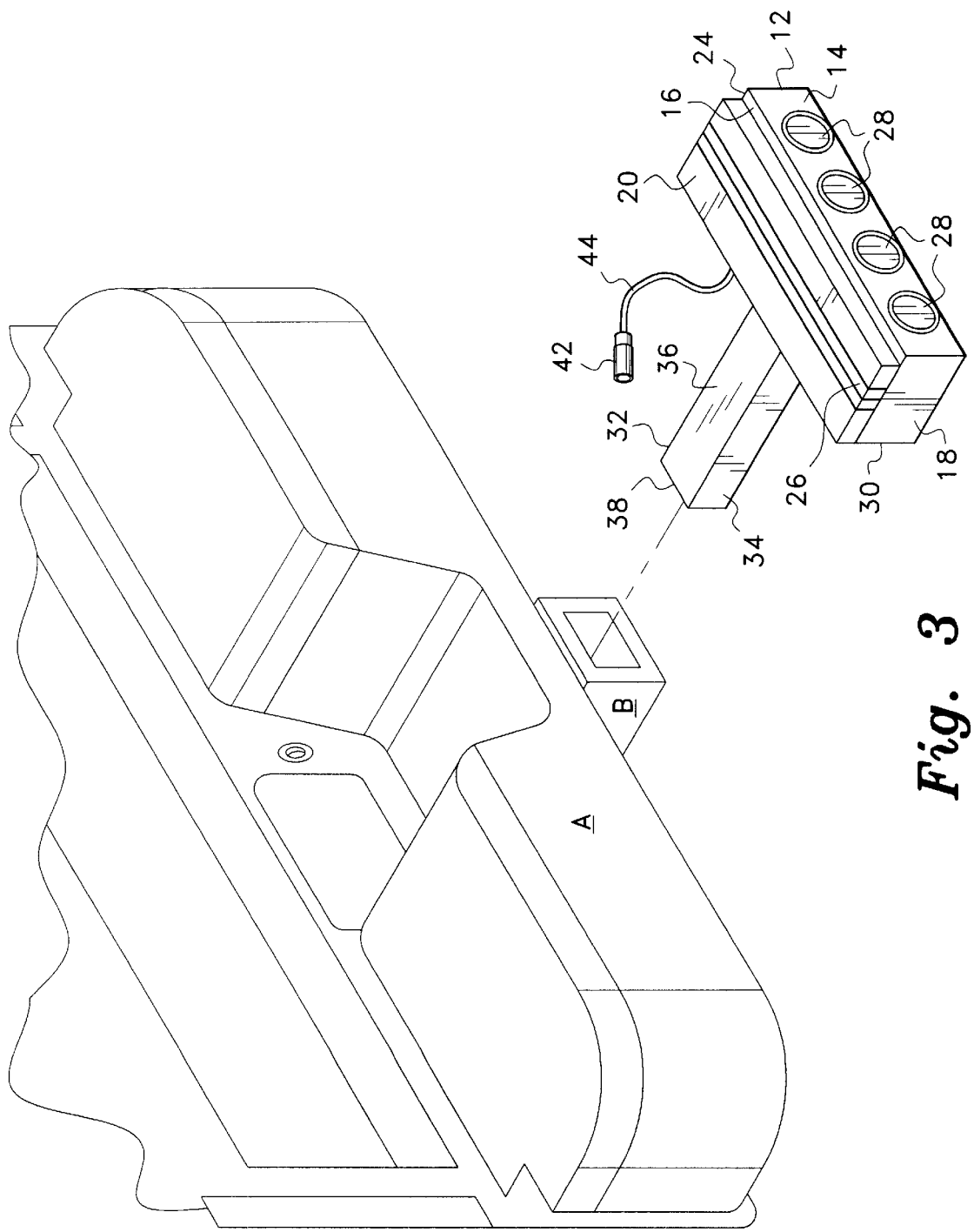
FIG. 3 is an exploded view of the brake warning light and step similar to the environmental, perspective view of FIG. 1.

Referring to FIG. 3, there is shown an exploded environmental perspective view similar to that of FIG. 1 showing vehicle rear bumper A and a standard trailer hitch B. Tongue or post member 32 is sized and configured to fit into the standard trailer hitch receptacle B and is insertable therein up to back wall 30. Member 32 is secured within trailer hitch B by any convenient means, such as a pin (not shown).

Figure 4:
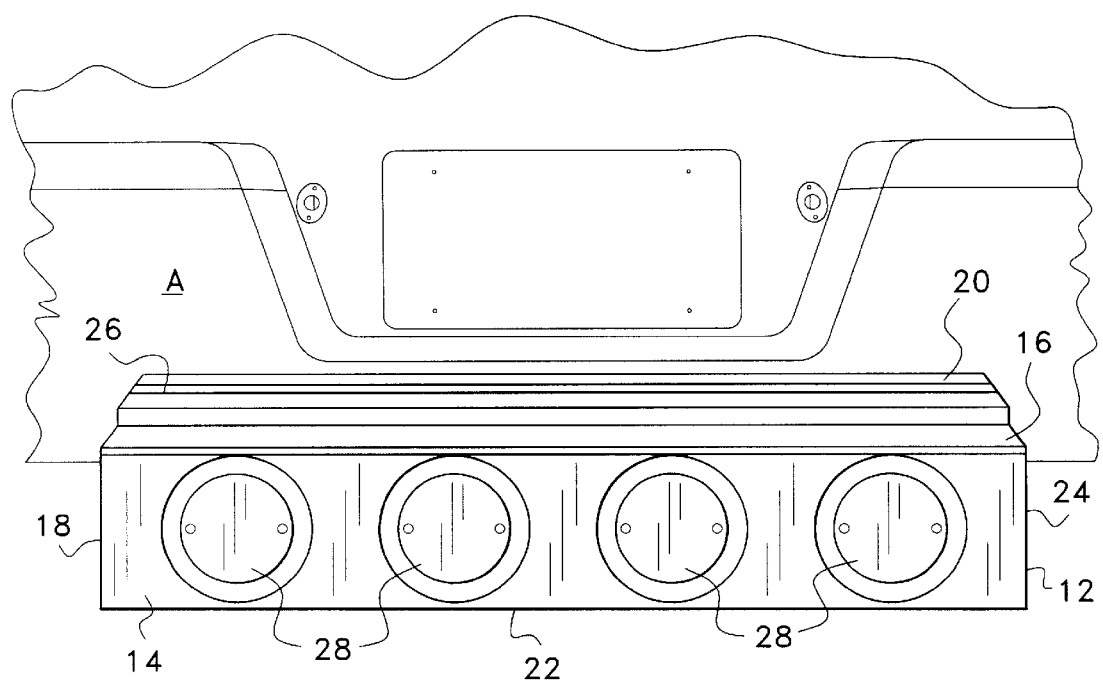
FIG. 4 is an environmental view in elevation of the brake warning light and step of FIG. 1.

Referring to FIG. 4, there is shown an environmental view in elevation of the brake warning light and step assembly 10 of FIG. 1 positioned relative to vehicle rear bumper A for use.

Housing unit 12 may conveniently be made of steel rectangular tubing, but may be constructed of other materials as desired. Tread member 20 may be made of rubber or similar slip resistant material. Brake warning lights 28 are of a standard type, preferably giving a red light signal upon actuation. Brake warning lights 28 are conveniently mounted flush with front wall 14 within holes or recesses to avoid breakage during use.

In operation, brake warning light and step assembly 10 is mounted on the vehicle with tread member 20 in its upward position by inserting tongue member 32 into trailer hitch B until back wall 30 is reached. The assembly 10 is then secured by inserting a pin through the combined trailer hitch B and tongue member 32. Trailer electrical connector 42 is then connected with the vehicle's standard trailer electrical receptacle. The present invention provides a vehicle added brake warning light and also serves as a secure step for boarding the vehicle, but may be removed to insert a trailer hitch ball neck unit when using a trailer.

It is to be understood that the present invention is not limited to the embodiment described above, but encompasses any and all embodiments within the scope of the following claims.

We claim:

1. A brake warning light and step assembly for a vehicle trailer hitch, said assembly comprising:

a housing unit consisting of an elongated tube with a generally rectangular cross section, said elongated tube including a front wall, a back wall, a top wall, a bottom wall and opposite end walls;

a tread member mounted on the top wall or said housing unit;

at least once brake warning light mounted within said housing unit along the front wall;

a post member having a tubular shape with a rectangular cross section, said post member being securely attached centrally and perpendicularly to the back wall of said housing unit; and an electrical wire extending from said housing unit and connecting at one end to said at least one brake warning light, said wire having a connector attached at an opposite end thereof;

whereby upon securely inserting the post member into a trailer hitch of a vehicle and connecting the electrical wire to an electrical receptacle on the vehicle, the assembly serves as a secure step for accessing the vehicle and provides the vehicle an added brake warning light when actuated by operating a brake pedal.

2. A brake warning light and step assembly according to claim 1, wherein said tread member is made of a slip resistant material.

3. A brake warning light and step assembly according to claim 2, wherein said tread member is made of rubber.

4. A brake warning light and step assembly according to claim 1, wherein said housing unit and said post member are constructed of steel.

5. A brake warning light and step assembly according to claim 1, wherein said at least one light includes a plurality of brake lights linearly disposed along the front wall of said housing unit.

* * * * *